(No Model.)

J. HABRIE.
BREAD CUTTER.

No. 576,308. Patented Feb. 2, 1897.

Witnesses,

Inventor,
Jules Habrie

UNITED STATES PATENT OFFICE.

JULES HABRIE, OF SAN FRANCISCO, CALIFORNIA.

BREAD-CUTTER.

SPECIFICATION forming part of Letters Patent No. 576,308, dated February 2, 1897.

Application filed October 2, 1896. Serial No. 607,664. (No model.)

*To all whom it may concern:*

Be it known that I, JULES HABRIE, a citizen of the United States, residing in the city and county of San Francisco, State of California, have invented an Improvement in Bread-Cutters; and I hereby declare the following to be a full, clear, and exact description of the same.

My invention relates to a device which is especially adapted for cutting bread and other substances into slices; and it consists of the parts and the constructions and combinations of parts hereinafter described and claimed.

Figure 1:
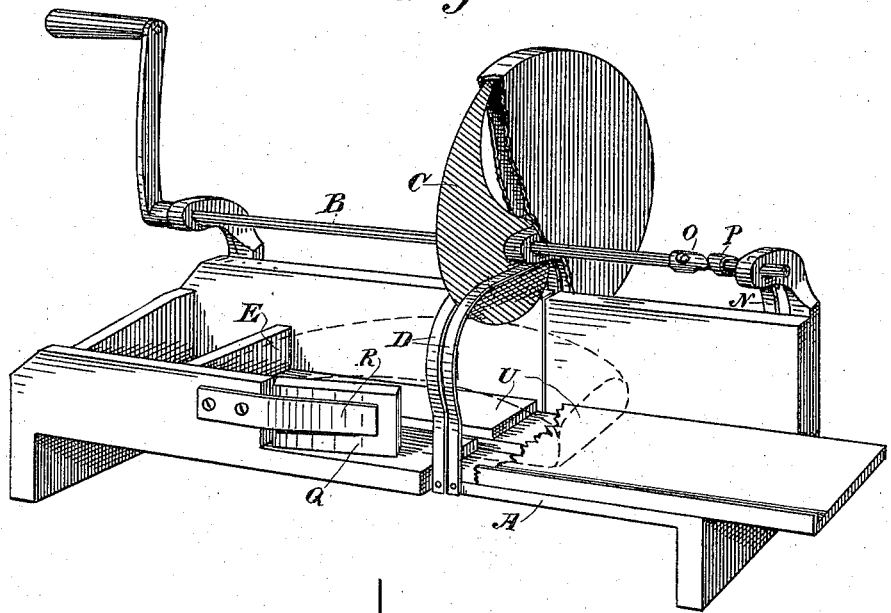
Figure 2:
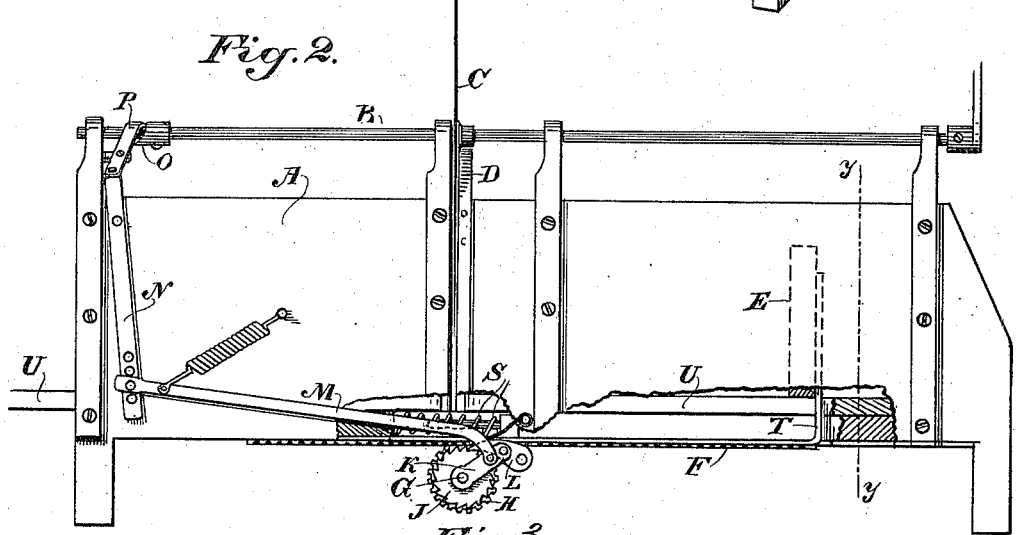
Figure 3:
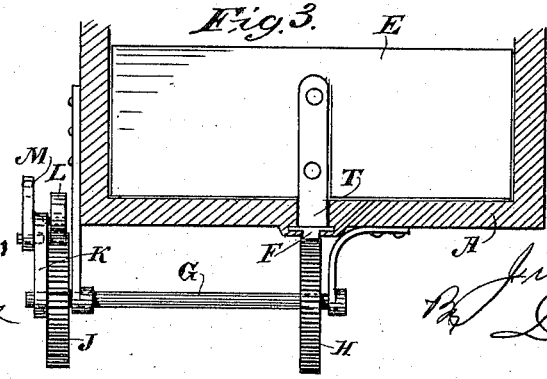

Figure 1 is a view of my cutter. Fig. 2 is an elevation of the back of the machine. Fig. 3 is a cross-section on line *y y* of Fig. 2.

A is a base or support.

B is a shaft turning in journal-boxes suitably fixed to the support, the shaft extending longitudinally above the apparatus and having fixed to it a knife or cutter C.

This knife or cutter is in the present case shown in the form of a cam, the edge gradually increasing in distance from the shaft to the outer end of the cam, so that when it is turned and brought into contact with the loaf of bread lying in the guide and support it will cut transversely through it with a drawing cut.

D D are guide-plates fixed to the frame close together, and between these the blade passes and is steadied against side movement. The bread to be cut is laid in the trough or channel fixed upon the frame at one side of the cutter, and a movable plate E, having a rack-bar F fixed to it, presses against the rear end of the loaf. This plate acts to advance the loaf along the trough in the following manner: Beneath the framework is a transverse shaft G, having a pinion H, which engages the rack-bar. Upon the end of this shaft is a ratchet-wheel J, and pivoted to turn loosely upon the shaft is an arm K, which carries a spring-actuated pawl L, this pawl being kept in engagement with the teeth of the ratchet by the action of its spring. The arm K has pivoted to it one end of a connecting-rod M, and the opposite end of this rod is connected with a swinging lever N, pivoted to the side of the apparatus.

Upon the main shaft which carries the knife or cutter is a cam O, so constructed as to intermittently engage with a lever-arm P conveniently fulcrumed to the apparatus. The opposite end of this lever-arm engages the previously-described lever N, so that when the cam acts upon the lever P the motion will be transmitted through the lever N and connecting-rod to the arm K, which is fulcrumed upon the ratchet-wheel shaft, and by its oscillations it acts to advance the ratchet-wheel, turning its shaft and the pinion which engages the rack-bar, thus moving the bread or material to be cut a suitable distance between each revolution of the knife. The cam by which this mechanism is advanced is so constructed that the advance takes place after the knife has completed its cut and before it has again revolved to a position to commence a new cut.

The connection between the rod M and the lever N is such that the amount of movement may be lengthened or shortened, so as to advance the feed at any desired rate, and thus make the slices thicker or thinner at will. The loaf is kept in place and its advance resisted by an arm or plate Q, hinged to the side of the trough and having a spring R pressing upon it which tends to force it inwardly against the side of the advancing loaf. This keeps the loaf pressed against the opposite side of the trough and prevents it moving out of place as it advances.

What the loaf has been advanced so that the last slice has been cut, the further movement of the feed will be prevented by means of a spring S, fixed in the bottom of the frame and which is engaged by a downwardly-projecting lug or arm T, fixed to the feed-board at the rear of the loaf. When this arm strikes the spring, by reason of the advance caused by the rack and pinion, the spring will act to force the device back again without allowing it to be fed forward any farther by the pawl-and-ratchet mechanism, the shaft being oscillated back and forward by the action of the cam O.

Whenever the loaf is finished, the feed-board can be moved back to the end of its travel by disengaging the pawl from the ratchet-wheel and drawing the feed-board back.

The trough or bed of the apparatus is provided with a false or double bottom U, upon the upper part of which the bread lies when it is desired to cut it entirely through and separate the slices; but if it is desired to only cut the slices nearly through and leave them connected at one edge the upper false bottom is removed and the bread will lie upon the main bottom of the trough, so that its lower part is just out of reach of the edge of the cutting-knife when the latter is revolved. This leaves the slices all attached by a thin line of bread-crust upon one side.

It will be manifest that the device may be used for slicing any substance or material which can be cut so as to separate it into slices of even thickness.

Having thus described my invention, what I claim as new, and desire to secure by Letters Patent, is—

1. The combination in a device for cutting bread and like substances, of a trough or guide to receive the bread, a shaft journaled longitudinally above the trough, a cam-shaped cutting-blade fixed to the shaft, transverse guides secured at opposite ends to the frame and spanning the trough, and between which the blade is movable, a feed-board projecting upwardly into the trough behind the loaf having a rack fixed to it, a transverse shaft, a pinion on one end thereof to engage the rack, a ratchet-wheel fixed upon the opposite end of the shaft, a spring-actuated pawl engaging the ratchet-wheel, a cam fixed upon the main shaft and intermediate mechanism actuated by the cam whereby the pawl is oscillated backward and forward in relation to the ratchet-wheel.

2. In a device for cutting bread and like substances, the combination, with a trough or guide for the substances to be cut, a rotatable shaft having a cam-shaped knife, adapted to be drawn across said trough, a feed-bar movable in the trough, a transverse shaft having a pinion to engage the rack-bar, and a ratchet-wheel on said transverse shaft, of means for operating the feed-bar consisting of an arm loosely mounted on the transverse shaft, and provided with a pawl to engage the ratchet-wheel, a rod extending from the arm, a pair of levers fulcrumed between their ends and connected together, and a cam on the main shaft to engage the free end of one of said levers, said rod being adjustably connected with the free end of the other lever to increase or decrease the thickness of the slice to be cut.

3. An improved slicing-machine consisting of a trough, a longitudinal shaft above the same, a cam-shaped knife on said shaft, spaced transverse plates spanning the trough and serving as a guide and brace for the knife, a feed-bar in the bottom of the trough, a shaft journaled transversely below the trough having a pinion on one end, to engage the feed-bar, and a ratchet-wheel on the opposite end, an arm loose on the transverse shaft, and provided with a pawl to engage the ratchet-wheel, a rod extending from said arm, a cam on the main shaft, a lever fulcrumed between its ends and having one end intermittently engaged by said cam, a second lever fulcrumed between its ends having one end connected with the opposite end of the first-named lever, and having its opposite end adjustably connected with the outer end of the said rod, to adjust the length of the feed and the thickness of the slice to be cut, and a spring fixed to the frame so as to form contact with the feed-bar and stop it when it has reached the end of its travel.

4. In a slicing-machine having a trough and means for feeding the substance therethrough, a rotatable cutter journaled above the trough so that its cutting edge sweeps across the trough in a plane just above and out of contact with its bottom, whereby the slices are left connected at their lower edges and a removable false bottom upon which the substance is placed when the slices are to be entirely severed.

In witness whereof I have hereunto set my hand.

JULES HABRIE.

Witnesses:
S. H. NOURSE,
JESSIE C. BRODIE.